United States Patent
Khatri et al.

(10) Patent No.: US 9,563,439 B2
(45) Date of Patent: Feb. 7, 2017

(54) CACHING UNIFIED EXTENSIBLE FIRMWARE INTERFACE (UEFI) AND/OR OTHER FIRMWARE INSTRUCTIONS IN A NON-VOLATILE MEMORY OF AN INFORMATION HANDLING SYSTEM (IHS)

(71) Applicant: Dell Products, L.P., Round Rock, TX (US)

(72) Inventors: Mukund P. Khatri, Austin, TX (US); Dirie N. Herzi, Leander, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 64 days.

(21) Appl. No.: 14/696,557

(22) Filed: Apr. 27, 2015

(65) Prior Publication Data
US 2016/0314002 A1  Oct. 27, 2016

(51) Int. Cl.
G06F 9/00 (2006.01)
G06F 9/44 (2006.01)

(52) U.S. Cl.
CPC .................................. *G06F 9/4403* (2013.01)

(58) Field of Classification Search
CPC .............................. G06F 9/4401; G06F 9/4411
USPC ............................................................ 713/2
See application file for complete search history.

(56) References Cited

U.S. PATENT DOCUMENTS

| | | | | |
|---|---|---|---|---|
| 8,291,209 B2 * | 10/2012 | Chong | .................... | G06F 9/441 713/2 |
| 8,429,390 B2 * | 4/2013 | Yu | .......................... | G06F 9/4401 710/8 |
| 9,262,178 B2 * | 2/2016 | Rothman | .............. | G06F 9/4406 |
| 2007/0005952 A1 * | 1/2007 | Ho | .......................... | G06F 9/4401 713/2 |
| 2015/0363320 A1 * | 12/2015 | Kumar | .................... | G06F 21/00 711/103 |
| 2015/0378846 A1 * | 12/2015 | Hagiwara | ............. | G06F 21/572 714/19 |
| 2016/0180094 A1 * | 6/2016 | Dasar | .................... | G06F 21/575 714/36 |

* cited by examiner

*Primary Examiner* — Chun Cao
(74) *Attorney, Agent, or Firm* — Fogarty, L.L.C.

(57) ABSTRACT

Systems and methods for caching firmware instructions in a non-volatile memory of an information handling system (IHS). In an illustrative, non-limiting embodiment, an IHS may include a processor, a non-volatile memory coupled to the processor, and a unified extensible firmware interface (UEFI) chipset coupled to the processor. The processor may be configured to: copy instructions stored in the UEFI chipset to the non-volatile memory prior to a reboot or restart of the HIS, and, at least in part in response to the reboot or restart operation, load at least a subset of the instructions directly from the non-volatile memory rather than from the UEFI chipset as part of a fast boot mode of operation.

19 Claims, 2 Drawing Sheets

CACHING UNIFIED EXTENSIBLE FIRMWARE INTERFACE (UEFI) AND/OR OTHER FIRMWARE INSTRUCTIONS IN A NON-VOLATILE MEMORY OF AN INFORMATION HANDLING SYSTEM (IHS)

FIELD

This disclosure relates generally to Information Handling Systems (IHSs), and, more specifically, to systems and methods for caching unified extensible firmware interface (UEFI) and/or other firmware instructions in a non-volatile memory of an IHS.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A typical IHS includes a processor (e.g., a multi-core processor), a basic input output system (BIOS), and a volatile memory (e.g., a random access memory (RAM) or the like), among numerous other components. A BIOS, for example, is a type of firmware stored in a chipset separate and distinct from the processor, that is used during the booting process. Generally, BIOS firmware is built into the IHS, and it is the first software the processor executes when the IHS is powered on.

A few of the main purposes of a BIOS include: initializing the IHS's hardware components, testing those components, and loading a boot loader or an operating system (OS) onto the IHS' memory. The BIOS also provides an abstraction layer to enable application programs and/or OSs to interact with certain hardware components such as, for example, keyboard(s), display(s), and/or other input/output (I/O) devices in a seamless manner. To these applications and/or the OS, variations in the IHS hardware may be hidden to the extent those applications and/or OS use BIOS services instead to attempting to directly access the hardware.

The Unified Extensible Firmware Interface (UEFI) was designed as a successor to conventional BIOS, aiming to address certain technical shortcomings. As of 2014, new IHS hardware predominantly ships with UEFI firmware instead of a BIOS.

The inventor hereof has recognized that reducing BIOS and/or UEFI boot time should be an area of focus, not just for client systems but also across servers and other IHSs. With the ever increasing amount of system memory and larger I/O configuration (especially in virtualized servers), keeping boot times within reasonable limits continues to be a challenge for the entire the industry.

For instance, with presently available technologies, even a routine BIOS power-on self test (POST) can take several minutes. A large portion of that delay results from slow accesses to the BIOS through the BIOS' serial peripheral interface (SPI) over a low pin count (LPC) bus, detection and configuration of memory in-line memory modules (DIMMs), retrieval and caching of instructions from peripheral devices, and/or loading of Optional Read Only Memory (ORPOM) firmware of adapter cards that control bootable peripherals.

SUMMARY

Embodiments of systems and methods for caching unified extensible firmware interface (UEFI) and/or other firmware instructions in a non-volatile memory of an Information Handling System (IHS) are described herein. In an illustrative, non-limiting embodiment, an IHS may include a processor; a non-volatile memory coupled to the processor, and an UEFI chipset coupled to the processor. The processor may be configured to: copy instructions stored in the UEFI chipset to the non-volatile memory prior to a reboot or restart of the IHS; and at least in part in response to the reboot or restart operation, load at least a subset of the instructions directly from the non-volatile memory rather than from the UEFI chipset as part of a fast boot mode of operation.

The non-volatile memory may include a non-volatile dual in-line memory module (NVDIMM), and the processor may be configured to: determine whether the NVDIMM is installed in the IHS, and, at least in part in response to the NVDIMM being installed in the IHS, entering the fast boot mode of operation. The processor may be further configured to: receive an indication of whether a chassis housing the IHS has been physically opened, and, at least in part in response to the chassis not having been open, enter the fast boot mode of operation.

The processor may be further configured to: receive an indication of whether the UEFI chipset has been updated or modified, and, at least in part in response to the UEFI chipset not having been updated or modified, entering the fast boot mode of operation. The processor may be further configured to write-protect a region or address range of the non-volatile memory where the subset of instructions are stored. In some cases, to load the subset of instructions, the processor may be further configured to send a reset vector to the UEFI chipset via a low pin count (LPC) bus.

The UEFI chipset may be configured to, upon receiving the reset vector, send a message to the processor with a reset address pointing to a region or address range of the non-volatile memory where the subset of instructions are stored. The subset of instructions may be stored in a compressed format within the UEFI chipset and loaded in the non-volatile memory in a decompressed format.

The IHS may also include an input/output (I/O) adapter, where the processor is configured to store an option read-only memory (OPROM) instruction from the I/O adapter in the non-volatile memory and to, at least in part in response to the reboot or restart operation, load at least a subset of the OPROM instructions directly from the non-volatile memory rather than from the I/O adapter as part of a fast boot mode of operation.

In another illustrative, non-limiting embodiment, in an Information Handling System (IHS) having a processor, a non-volatile memory coupled to the processor, and a unified extensible firmware interface (UEFI) chipset coupled to the processor, a method may include receiving, at the UEFI chipset, a reset vector transmitted by processor, where the receiving occurs after the processor's copying of at least a subset of instructions stored in the UEFI chipset to the non-volatile memory, and wherein the copying takes place prior to a reboot or restart of the IHS; and providing, by the UEFI chipset, a message having a reset address that points to a region or address range of the non-volatile memory where the subset of instructions are stored.

The non-volatile memory may include a non-volatile dual in-line memory module (NVDIMM), the method further comprising determining, by the processor, that the NVDIMM is installed in the IHS, and, at least in part in response to the determination, entering a fast boot mode of operation.

The method may further comprise loading, by the processor, at least a subset of the instructions directly from the non-volatile memory rather than from the UEFI chipset as part of the fast boot mode of operation. Additionally or alternatively, the method may further comprise determining, by the processor, that the UEFI chipset has not been updated or modified, and, at least in part in response to the determination, entering the fast boot mode of operation.

Additionally or alternatively, the method may further comprise write protecting, by the processor, the region or address range of the non-volatile memory where the subset of instructions are stored. Additionally or alternatively, the method may further comprise determining, by the processor, that a chassis housing the IHS has not been physically opened, and, at least in part in response to the determination, entering a fast boot mode of operation. Additionally or alternatively, the method may further comprise an input/output (I/O) adapter coupled to the processor, the method further comprising storing, by the processor, an option read-only memory (OPROM) instruction from the I/O adapter in the non-volatile memory, and, at least in part in response to the reboot or restart operation, load at least a subset of the OPROM instructions directly from the non-volatile memory rather than from the I/O adapter as part of the fast boot mode of operation. Additionally or alternatively, the method may further comprise decompressing the subset of instructions, by the processor, prior to loading the subset of instructions in the non-volatile memory.

In yet another illustrative, non-limiting embodiment, a memory device may have a program stored thereon that, upon execution by an IHS having a processor, a non-volatile memory coupled to the processor, a UEFI chipset coupled to the processor, causes the IHS to: cache instructions stored in the UEFI chipset within a given region or address range non-volatile memory prior to a reboot or restart of the IHS; at least in part in response to the reboot or restart of the IHS, generate a reset vector to be processed by the UEFI chipset; determine that a chassis housing the IHS has not been physically opened; determine that the UEFI chipset has not been updated or modified; and at least in part in response to both determinations, create a message having a reset address that points to the given region or address range of the non-volatile memory and load the subset of the instructions directly from the non-volatile memory rather than from the UEFI chipset as part of a fast boot operation.

In some cases, IHS may further comprise an input/output (I/O) adapter coupled to the processor. The program, upon execution by the IHS, further causes the IHS to cache an option read-only memory (OPROM) instruction stored the I/O adapter in the non-volatile memory, and, at least in part in response to the reboot or restart operation, load at least a subset of the OPROM instructions directly from the non-volatile memory rather than directly from the I/O adapter as part of the fast boot mode of operation.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
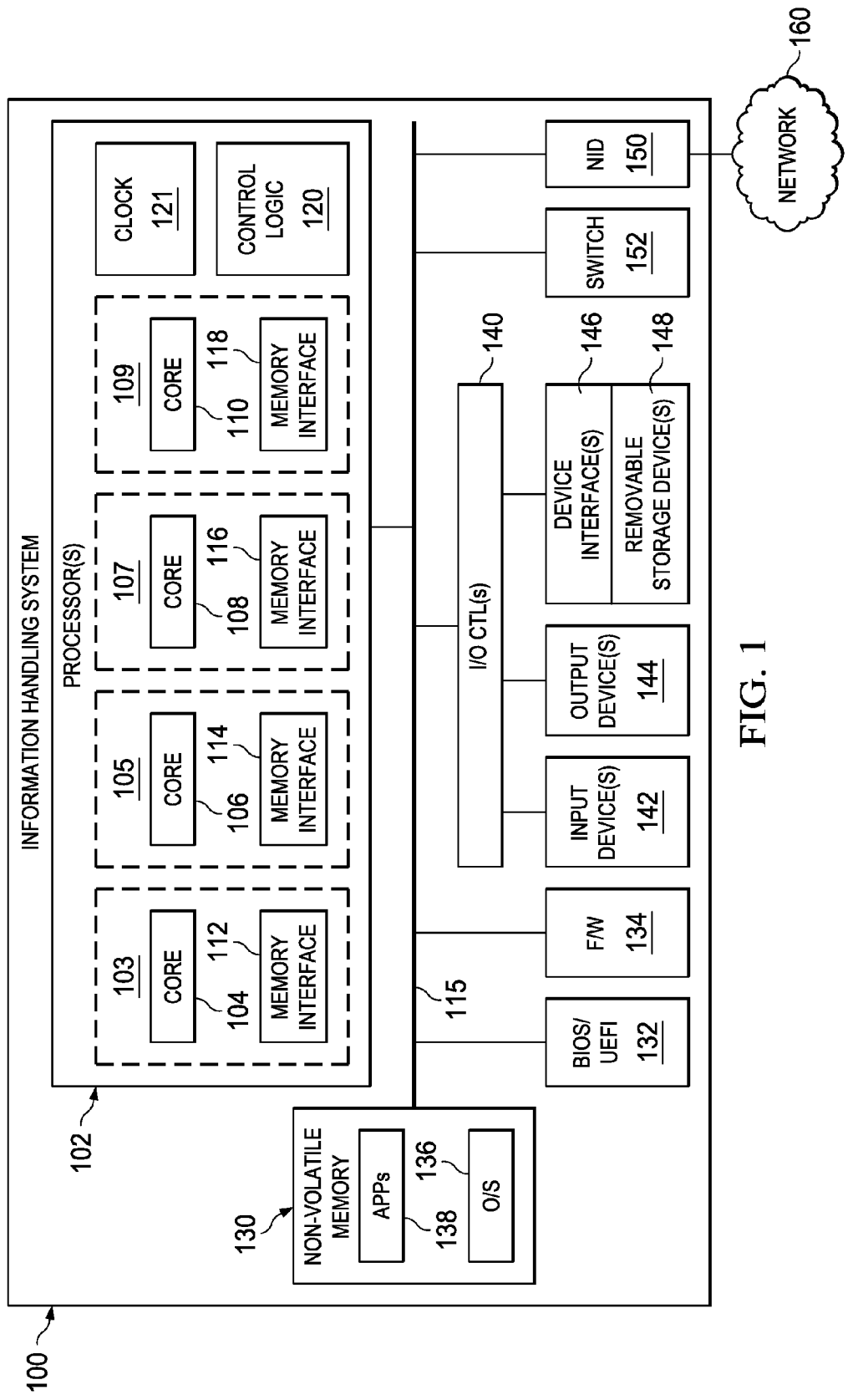
FIG. 1 illustrates an example IHS configured to implement various systems and methods described herein according to some embodiments.

Systems and methods for caching firmware instructions in a non-volatile memory of an information handling system (IHS) are described. As used herein, the term "BIOS" refers to a basic input output system as well as variations thereof, whether now existing or yet to be developed, such as, for example, the Unified Extensible Firmware Interface (UEFI) system. Also, the term "non-volatile memory" refers to a memory device having the ability to retain stored data even when its electrical power is removed, due to an unexpected power loss, system crash, user-initiated system shutdown, etc.

With the recent advent of non-volatile memory technology (e.g., non-volatile (NV) dual in-line memory modules (DIMMs) or "NVDIMMs"), the inventor hereof has identified opportunities for leveraging those technologies to improve BIOS, UEFI, and/or other firmware caching operations to shorten boot times. NVDIMMs referenced here may include energy-backed DDRx-based NVDIMMs, as well as non-DDRx based Flash or other suitable persistent memory or NVDIMMs. In some cases, IHS design and/or a memory controller may enable a dedicated/special NVDIMM decode operation for pre-determined and static NVDIMM cache location(s).

In some cases, the system and methods described herein may involve: avoiding slow accesses to the BIOS' flash Read-Only-Memory (ROM) or chipset via a serial peripheral interface (SPI) over a low pin count (LPC) bus, avoiding slow reads of double data rate (DDRx) dual in-line memory modules (DIMMs), avoiding one or more memory configuration steps, and/or avoiding slow accesses to input/output (I/O) devices' resident Optional ROMs (OPROMs).

NVDIMMs retain data when power is removed, thus allowing a BIOS to remain resident in the NVDIMM after a shutdown or reboot. This enables skipping a BIOS shadowing process and restoring chipset configuration parameters from NVDIMM on subsequent boots. Other system payloads such as OPROMS may also be copied on initial boot, and stored in NVDIMM memory to improve boot time even further.

In some implementations, the BIOS may be capable of detecting chassis intrusion to ensure memory or device configurations have not changed. Furthermore, the BIOS can also keep a log of all attached devices and certain data stored in a serial presence detect (SPD) module to ensure memory and devices have not been added or removed. Upon detection of change, re-caching of new content/code/configuration to NVDIMM memory location may be be triggered along with one time conventional BIOS power-on self-test (POST).

Accordingly, in some embodiments, the systems and methods described herein may enable detection of the presence of NVDIMMs and absence of Chassis Intrusion event to initiate "fast boot mode of operation." Additionally or alternatively, some embodiments may enable caching of memory and chipset parameters in NVDIMMs. As such, these systems and methods may allow an IHS to skip memory initialization and long lead time training sequences. BIOS code may be saved to a designated or fixed memory location (e.g., a BIOS cache partition of the NVDIMM) and claim that memory range for BIOS code.

Additionally or alternatively, some embodiments may avoid having to read from BIOS SPI flash's slow access interface on subsequent boots (e.g., S4 and S5). Additionally or alternatively, some embodiments may enable saving embedded and adding I/O adapter's OPROMs to similar targeted NVDIMM memory location (e.g., in a firmware cache partition of the NVDIMM), and claiming the memory region for Platform OPROMs. As such, these systems and methods may avoid having to read/extract OPROMs from I/O devices on all subsequent boots. In some implementations, a BIOS settings option may be used enable and disable these features, and the IHS may log attached devices and memory related other relevant information (USB and SPD serial numbers, PCI DEV/VENID/etc.)

In one scenario, memory controller or NVDIMM may writeprotect a specific region or address range of NVDIMM where BIOS/Firmware cache resides. Moreover, the chipset may enable reset vector configuration as an option to route those vectors to a static or pre-configured NVDIMM memory in the IHS.

In the following detailed description of illustrative embodiments of the disclosure, non-limiting, illustrative embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

For purposes of this disclosure, an IHS, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a handheld device, personal computer, a server, a network storage device, or any other suitable device and may vary in size, shape, performance, functionality, and price. The IHS may include random access memory (RAM), one or more processing resources such as a CPU or hardware or software control logic, ROM, and/or other types of nonvolatile memory. Additional components of the IHS may include one or more disk drives, one or more network ports for communicating with external devices as well as various I/O devices, such as a keyboard, a mouse, and a video display. The IHS may also include one or more buses operable to transmit communications between the various hardware components.

FIG. 1 illustrates a block diagram representation of an example IHS 100, within which one or more of the described features of the various embodiments of the disclosure may be implemented. Particularly, IHS 100 has one or more processor(s) 102 coupled to non-volatile memory 130 via system interconnect 115. System interconnect 115 may be interchangeably referred to as a system bus. Non-volatile memory 130 may store a plurality of software including Operating System (OS) 136 and application(s) 138, or parts thereof. In addition, one or more instructions conventionally stored in BIOS/UEFI chipset 132 and/or firmware module 134 may be cached in non-volatile memory 130 and may be retrieved and executed by processor(s) 102 during operation of IHS 100. For example, in some cases, non-volatile memory 130 may be partitioned to include dedicated region(s) or address range(s) where the cached instructions are stored. Also, in some cases, the same region(s) or address range(s) may be write-protected by the processor, for example, after the caching operation is completed.

In some embodiments, processor(s) 102 may include several CPU sockets 103, 105, 107, and 109. Each socket may include its respective one or more processing core(s) 104, 106, 108, or 110; as well as its associated dedicated memory controller(s) and/or I/O lane(s) 112, 114, 116, or 118. In operation, processing cores 104, 106, 108, or 110 may be configured communicate with each other and with control logic 120. Moreover, control logic 120 may control the operation of processing cores 104, 106, 108, or 110. For example, in an embodiment, clock 121 may be provided on processor(s) 102 to enable the generation of several different periodic frequency signals that may be applied to one or more of the cores 104, 106, 108, or 110 within one or more processor(s) 102. Control logic 120 may then be configured to control the operating frequency and voltage or operating state of cores 104, 106, 108, or 110.

In addition, control logic 120 may be configured to cache BIOS software and/or firmware instructions (originally provided by BIOS/UEFI chipset 132 and firmware module 134) in non-volatile memory 130 during the operation of processor(s) 102, and to retrieve the cached instructions from non-volatile memory 130 (as opposed to retrieving those instructions from BIOS/UEFI chipset 132 or firmware module 134) in response to a reboot or restart of IHS 100 when certain conditions are met, as described in more detail below. In some cases, control logic 120 may perform additional operations, including, for instance, retrieving instructions originally stored in BIOS/UEFI chipset 132 or firmware module 134 in a compressed form, decompressing those instructions, and caching the instructions in non-volatile memory 130 in a decompressed form. In some implementations, a portion of the instructions may be stored in non-volatile memory 130 in a decompressed format, and a second portion of the instructions may be stored in non-volatile memory 130 in a compressed format.

IHS 100 also includes one or more input/output (I/O) controllers 140 which support connection by, and processing of signals from, one or more connected input device(s) 142, such as a keyboard, mouse, touch screen, or microphone. I/O controllers 140 also support connection to and forwarding of output signals to one or more connected output devices 144, such as a monitor or display device or audio speaker(s). Additionally, in one or more embodiments, one or more device interfaces 146, such as an optical reader, a Universal Serial Bus (USB), a card reader, Personal Computer Memory Card International Association (PCMCIA) slot, and/or a High-Definition Multimedia Interface (HDMI), may be associated with IHS 100. Device interface(s) 146 may be utilized to enable data to be read from or stored to corresponding removable storage device(s) 148, such as a Compact Disk (CD), Digital Video Disk (DVD), flash drive, or flash memory card. Device interfaces 146 may further include General Purpose I/O interfaces such as $I^{2C}$, SMBus, and peripheral component interconnect (PCI) buses.

IHS 100 comprises a Network Interface Device (NID) 150. NID 150 enables IHS 100 to communicate and/or interface with other devices, services, and components that are located external to IHS 100. These devices, services, and components may interface with IHS 100 via an external network, such as example network 160, using one or more communication protocols. Network 160 may be a local area network, wide area network, personal area network, and the like, and the connection to and/or between network and IHS 100 may be wired or wireless or a combination thereof. For purposes of discussion, network 160 is indicated as a single collective component for simplicity. However, it is appreciated that network 160 may comprise one or more direct connections to other devices as well as a more complex set of interconnections as may exist within a wide area network, such as the Internet.

In addition to the foregoing, in some embodiments IHS 100 may be housed within a chassis (not shown) and switch 152. Switch 152 may be implemented with a mechanical, electrical, or electro-mechanical switch configured to provide a signal to control logic 120 of processor 102 that is indicative of whether the chassis has been physically opened by a user, which may happen as part of typical IHS maintenance procedures or tampering, for instance.

A person of ordinary skill in the art will appreciate that the hardware components and basic configuration depicted in FIG. 1 and described herein may vary. For example, the illustrative components within IHS 100 are not intended to be exhaustive, but rather are representative to highlight components that may be utilized to implement systems and methods described herein. For example, other devices/components may be used in addition to or in place of the hardware depicted. The depicted example does not convey or imply any architectural or other limitations with respect to the presently described embodiments and/or the general disclosure.

Figure 2:
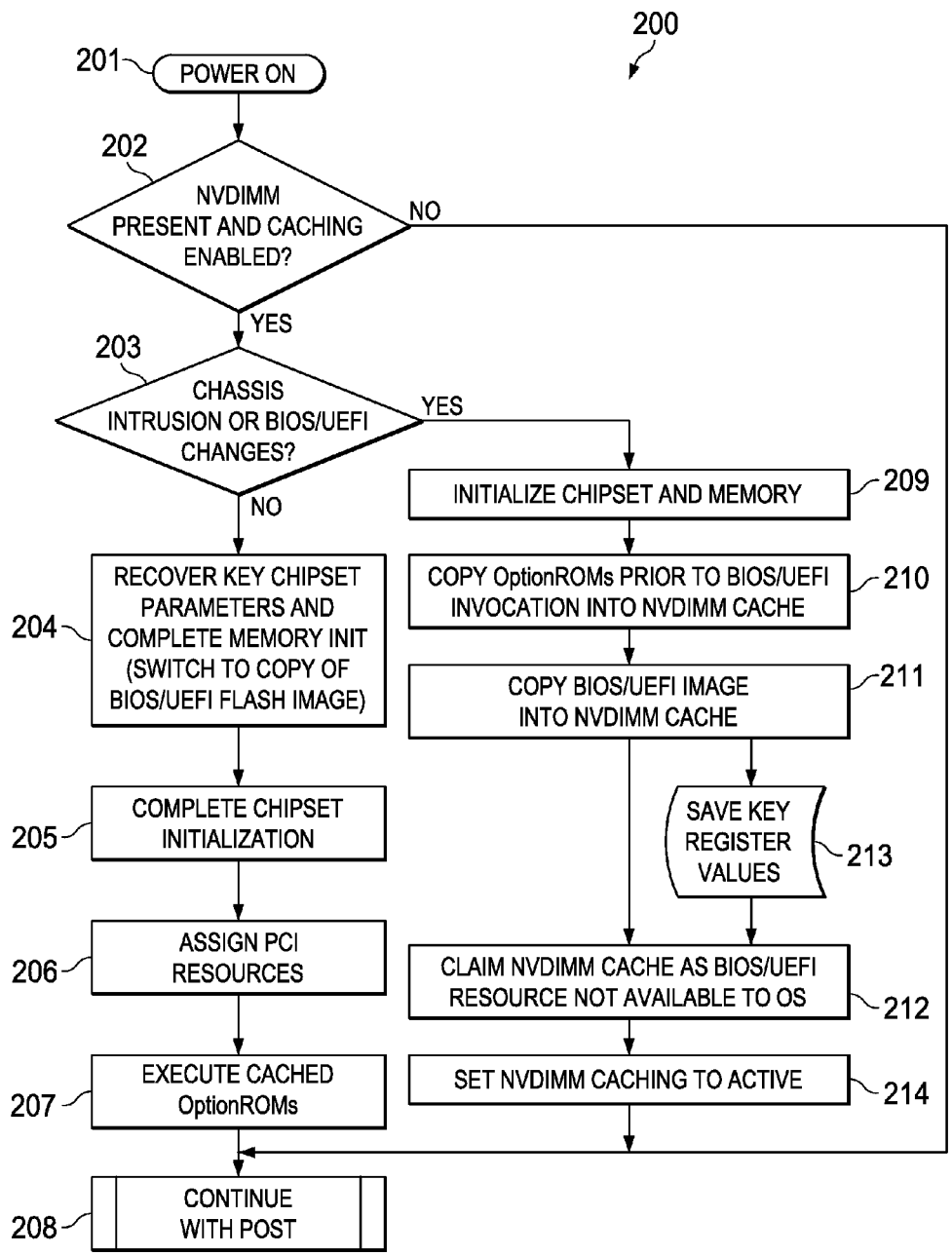
FIG. 2 is a flowchart illustrating an example of a method for caching basic input output system (BIOS), unified extensible firmware interface (UEFI), and/or other firmware instructions, in a non-volatile memory of an IHS according to some embodiments.

FIG. 2 is a flowchart illustrating an example of method 200 for caching basic input output system (BIOS), unified extensible firmware interface (UEFI), and/or other firmware instructions in a non-volatile memory of an IHS. In some embodiments, method 200 may be executed, for example, as part of a BIOS POST operation.

In the discussion that follows, reference is made to various components illustrated in FIG. 1. In some embodiments, method 200 may be performed, at least in part, by processor 102, non-volatile memory 130, BIOS/UEFI chipset 132, firmware module 134, and/or switch 152.

At block 201, IHS 100 is powered on. Then, at block 202, control logic 120 of processor 102 determines whether non-volatile memory 130 (e.g., an NVDIMM module) is present in the system, and also whether caching is enabled. If not, method 200 skips to block 208 and other parts of the POST operation may continue to be executed. Otherwise, block 203 determines whether there has been a chassis intrusion. For example, in some implementations, block 203 may involve switch 152 transmitting a signal to processor 102 that indicates, to control logic 120, that the chassis has been physically opened or tampered with. Block 203 may also indicate whether a BIOS configuration change has been made since the last boot.

If there has not been a chassis intrusion and there have been no BIOS configuration changes since the last boot, then block 204 recovers BIOS chipset parameters, completes a memory initialization procedure, and copies a BIOS image to non-volatile memory 130. In some cases, original BIOS instructions may be stored in the BIOS' own chipset 132 in compressed form, and block 204 may decompress those instructions prior to storing them in the non-volatile memory in decompressed form.

At block 205, method 200 completes BIOS chipset initialization. After initialization, IHS 100 may disconnect BIOS/UEFI chipset 132 from bus 115. For example, method 200 may further include, also as part of block 205, causing BIOS/UEFI chipset 132 to become physically disconnected from a low pin count (LPC) bus or serial peripheral interface (SPI) components part or bus 115. Then, block 206 assigns PCI resources, block 207 executes cached OPROMs. At block 208, other parts of the POST procedure may continue to be executed.

In other words, when there has not been a chassis intrusion and/or there have been no BIOS configuration changes since the last boot, method 200 may enable caching of BIOS, UEFI, and/or other firmware instructions in an NVDIMM, and it may use the that data in subsequent boots in order to reduce boot times and increase efficiency within IHS 100.

Conversely, if indeed there has been a chassis intrusion and/or there have been BIOS configuration changes since the last boot, as determined at block 208, then method 200 loads UEFI, and/or other firmware instructions from the original sources, as opposed to the copies stored in NVDIMM, and proceed to cache that information for the next boot where there has not been an intrusion configuration changes.

Particularly, at block 209, the BIOS chipset and NVDIMM are initialized. Also, method 200 may sets the NVDIMM caching to "inactive," so that processor 102 knows that the caching in NVDIMM 130 is potentially unsafe (e.g., due to detected chassis tampering, whether authorized or not) or outdated (e.g., due to configuration changes). At block 210, OPROM(s) may be cached in the NVDIMM prior to the BIOS' invocation. Then, at block 211, a BIOS image may also be cached in the NVDIMM. At blocks 212 and 213, method 200 claims the NVDIMM cache as a BIOS resource not available to the IHS' OS, and also saves key register values in the NVDIMM, respectively. Block 214 sets the NVDIMM caching to "active," so that processor 102 knows that the caching in NVDIMM 130 is safe and/or accurate, and block 208 continues to execute other parts of the POST procedure. Also, processor 120 may again writeprotect the caching area of memory 130.

In some cases, method 200 may behave differently depending upon whether block 208 indicates that chassis intrusion or BIOS changes took place. For instance, if block 208 detects chassis intrusion, the entire NVDIMM BIOS cache may be flushed. On the other hand, if configuration changes have been made but there was been no intrusion, the existing NVDIMM cached may still be used, with such cached updated to reflect those configuration changes.

In the above described flowchart, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product or memory device embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a memory device or a computer readable storage device may be any tangible medium that can contain, or store a program for use by or in connection with an instruction execution system, apparatus, or device.

While the disclosure has been described with reference to illustrative embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a processor;
a non-volatile memory coupled to the processor; and
a unified extensible firmware interface (UEFI) chipset coupled to the processor, wherein the processor is configured to:
copy instructions stored in the UEFI chipset to the non-volatile memory prior to a reboot or restart of the IHS, wherein the non-volatile memory includes a non-volatile dual in-line memory module (NVDIMM);
at least in part in response to the reboot or restart operation, load at least a subset of the instructions directly from the non-volatile memory rather than from the UEFI chipset as part of a fast boot mode of operation; and
determine whether the NVDIMM is installed in the IHS, and, at least in part in response to the NVDIMM being installed in the IHS, enter the fast boot mode of operation.

2. The IHS of claim 1, wherein the processor is further configured to: receive an indication of whether a chassis housing the IHS has been physically opened, and, at least in part in response to the chassis not having been open, entering the fast boot mode of operation.

3. The IHS of claim 1, wherein the processor is further configured to: receive an indication of whether the UEFI chipset has been updated or modified, and, at least in part in response to the UEFI chipset not having been updated or modified, enter the fast boot mode of operation.

4. The IHS of claim 1, wherein the processor is further configured to write-protect a region or address range of the non-volatile memory where the subset of instructions are stored.

5. The IHS of claim 1, wherein to load the subset of instructions, the processor is further configured to send a reset vector to the UEFI chipset via a low pin count (LPC) bus.

6. The IHS of claim 5, wherein the UEFI chipset is configured to, upon receiving the reset vector, send a message to the processor with a reset address pointing to a region or address range of the non-volatile memory where the subset of instructions are stored.

7. The IHS of claim 1, wherein the subset of instructions is stored in a compressed format within the UEFI chipset and loaded in the non-volatile memory in a decompressed format.

8. The IHS of claim 1, further comprising an input/output (I/O) adapter, wherein the processor is configured to store an option read-only memory (OPROM) instruction from the I/O adapter in the non-volatile memory and to, at least in part in response to the reboot or restart operation, load at least a subset of the OPROM instructions directly from the non-volatile memory rather than from the I/O adapter as part of a fast boot mode of operation.

9. In an Information Handling System (IHS) having a processor, a non-volatile memory coupled to the processor, and a unified extensible firmware interface (UEFI) chipset coupled to the processor, a method comprising:
receiving, at the UEFI chipset, a reset vector transmitted by processor, wherein the receiving occurs after the processor's copying of at least a subset of instructions stored in the UEFI chipset to the non-volatile memory, wherein the non-volatile memory includes a non-volatile dual in-line memory module (NVDIMM), and wherein the copying takes place prior to a reboot or restart of the IHS;
providing, by the UEFI chipset, a message having a reset address that points to a region or address range of the non-volatile memory where the subset of instructions are stored; and
determining, by the processor, that the NVDIMM is installed in the IHS, and, at least in part in response to the determination, entering a fast boot mode of operation.

10. The method of claim 9, further comprising loading, by the processor, at least a subset of the instructions directly from the non-volatile memory rather than from the UEFI chipset as part of the fast boot mode of operation.

11. The method of claim 9, further comprising determining, by the processor, that the UEFI chipset has not been updated or modified, and, at least in part in response to the determination, entering the fast boot mode of operation.

12. The method of claim 9, further comprising write protecting, by the processor, the region or address range of the non-volatile memory where the subset of instructions are stored.

13. The method of claim 9, further comprising determining, by the processor, that a chassis housing the IHS has not been physically opened, and, at least in part in response to the determination, entering a fast boot mode of operation.

14. The method of claim 13, further comprising an input/output (I/O) adapter coupled to the processor, the method further comprising storing, by the processor, an option read-only memory (OPROM) instruction from the I/O adapter in the non-volatile memory, and, at least in part in response to the reboot or restart operation, load at least a subset of the OPROM instructions directly from the non-volatile memory rather than from the I/O adapter as part of the fast boot mode of operation.

15. The method of claim 13, further comprising decompressing the subset of instructions, by the processor, prior to loading the subset of instructions in the non-volatile memory.

16. An Information Handling System (IHS), comprising:
a processor;
a non-volatile memory coupled to the processor; and
a unified extensible firmware interface (UEFI) chipset coupled to the processor, wherein the processor is configured to:
copy instructions stored in the UEFI chipset to the non-volatile memory prior to a reboot or restart of the IHS;
at least in part in response to the reboot or restart operation, load at least a subset of the instructions directly from the non-volatile memory rather than from the UEFI chipset as part of a fast boot mode of operation; and
receive an indication of whether a chassis housing the IHS has been physically opened, and, at least in part in response to the chassis not having been opened, entering the fast boot mode of operation.

17. An Information Handling System (IHS), comprising:
a processor;
a non-volatile memory coupled to the processor; and
a unified extensible firmware interface (UEFI) chipset coupled to the processor, wherein the processor is configured to:
copy instructions stored in the UEFI chipset to the non-volatile memory prior to a reboot or restart of the IHS;

at least in part in response to the reboot or restart operation, load at least a subset of the instructions directly from the non-volatile memory rather than from the UEFI chipset as part of a fast boot mode of operation; and write-protect a region or address range of the non-volatile memory where the subset of instructions is stored.

18. In an Information Handling System (IHS) having a processor, a non-volatile memory coupled to the processor, and a unified extensible firmware interface (UEFI) chipset coupled to the processor, a method comprising:

receiving, at the UEFI chipset, a reset vector transmitted by processor, wherein the receiving occurs after the processor's copying of at least a subset of instructions stored in the UEFI chipset to the non-volatile memory, and wherein the copying takes place prior to a reboot or restart of the IHS;

providing, by the UEFI chipset, a message having a reset address that points to a region or address range of the non-volatile memory where the subset of instructions are stored; and write protecting, by the processor, the region or address range of the non-volatile memory where the subset of instructions is stored.

19. In an Information Handling System (IHS) having a processor, a non-volatile memory coupled to the processor, and a unified extensible firmware interface (UEFI) chipset coupled to the processor, a method comprising:

receiving, at the UEFI chipset, a reset vector transmitted by processor, wherein the receiving occurs after the processor's copying of at least a subset of instructions stored in the UEFI chipset to the non-volatile memory, and wherein the copying takes place prior to a reboot or restart of the IHS;

providing, by the UEFI chipset, a message having a reset address that points to a region or address range of the non-volatile memory where the subset of instructions are stored; and determining, by the processor, that a chassis housing the IHS has not been physically opened, and, at least in part in response to the determination, entering a fast boot mode of operation.

* * * * *